United States Patent

Carré et al.

[11] 4,056,234
[45] Nov. 1, 1977

[54] METERING DEVICE FOR A POWDERY MATERIAL

[75] Inventors: Christian Carré, Houilles, France; Claude Rouault, Vlissingen, Netherlands

[73] Assignee: Air-Industrie, Courbevoie, France

[21] Appl. No.: 629,929

[22] Filed: Nov. 7, 1975

[30] Foreign Application Priority Data

Nov. 14, 1974 France .................................. 74.37566

[51] Int. Cl.² ............................................. B65B 1/06
[52] U.S. Cl. ................................ 141/392; 340/239 R; 366/191
[58] Field of Search ........................... 259/18, 19, 36; 222/199, 55, 200, 151, 150, 196.3, 196, 529; 73/228; 340/239 R, 246, 239; 198/524; 141/392.

[56] References Cited

U.S. PATENT DOCUMENTS

| 707,544 | 8/1902 | Bates | 222/151 X |
|---|---|---|---|
| 964,433 | 7/1910 | Kinsley | 222/150 |
| 1,213,634 | 1/1917 | Havassy | 222/151 |
| 2,561,763 | 7/1951 | Waters et al. | 340/239 R X |
| 2,955,466 | 10/1960 | Coles | 340/246 X |
| 3,276,248 | 10/1966 | Cyr | 340/239 F X |
| 3,284,788 | 11/1966 | Hudson | 340/239 R |
| 3,387,489 | 6/1968 | Young | 340/239 R X |
| 3,446,979 | 5/1969 | Ricciardi | 340/239 R X |
| 3,840,155 | 10/1974 | Frye et al. | 222/196 X |

FOREIGN PATENT DOCUMENTS 1,157,681  12/1957  France .................... 222/196

*Primary Examiner*—Robert B. Reeves
*Assistant Examiner*—Norman L. Stack, Jr.
*Attorney, Agent, or Firm*—Larson, Taylor and Hinds

[57] ABSTRACT

At the outlet of the duct for the powdery material is provided a movable diaphragm where orifice is adapted to engage a clearing fixed pin when the flow rate of said material reaches a predetermined low threshold. Said diaphragm is controlled by clearance actuating means comprising a pneumatic jack adapted to be supplied with compressed air through an electro-valve whose control input is connected to the output of a flow detector.

5 Claims, 1 Drawing Figure

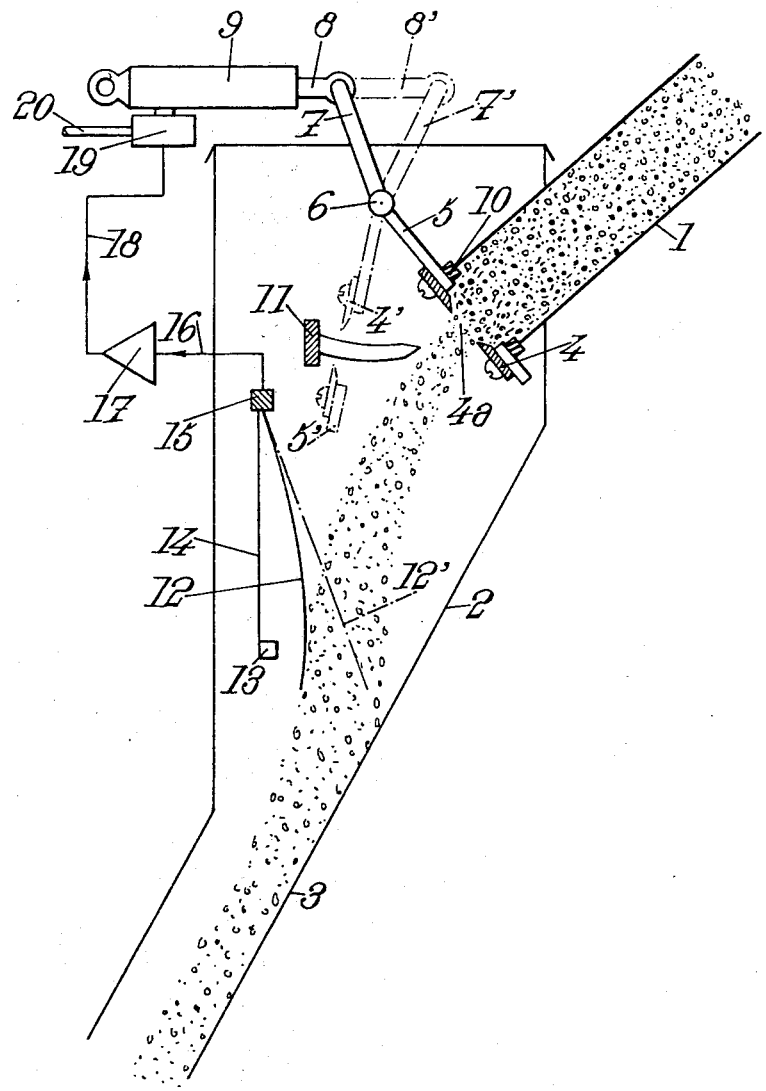

METERING DEVICE FOR A POWDERY MATERIAL

The present invention relates to a metering device for a powdery material normally flowing in a duct provided at its outlet with a removable diaphragm determining the flow rate of said material.

By the expression "powdery material" is meant here a material constituted by more or less coarse particles; this material can also be relatively aerated. It relates, in particular, to a continuously flowing powdered material which can clog by itself or contain clogging substances or even foreign bodies of more or less large dimensions.

When such a material flows in a duct, for example solely under the effect of gravity, the problem of unclogging or of freeing the duct arises when it is notably obstructed, this obstruction occuring in general at the site of the removable diaphragm, which is provided with a calibrated orifice adapted to determine the flow rate of the material in the duct. This problem can arise in particular but not exclusively in a duct for the dispensing of clean alumina, before its injection into a fluorine adsorption installation, it being understood that the alumina powder can contain various debris such as rust, flakes, wood chips . . . which debris generally comes from the containers.

The object of the present invention is to produce a device for metering a powdery material, which comprises means adapted for clearing automatically the duct in which the material flows normally, when this appears necessary, this device having to be simple, cheap and reliable.

To this end, a metering device according to the invention is characterized in that it comprised a flow detector adapted to provide a signal at its output when the flow rate of the stream reaches a predetermined lower threshold, following partial or total obstruction of the diaphragm orifice and clearance actuating means for causing freeing of said diaphragm adapted to be operated by said signal and arranged to cause clearing of said orifice.

Preferably, this device includes a freeing member constituted by a clearing pin adapted to be engaged in the diaphragm orifice.

According to a particularly advantageous embodiment of the invention, this device may also be characterized in that said clearing pin is fixed, in a flow box arranged downstream of said diaphragm, and in that the latter is movable and can effect, under the action of said clearance actuating means, a movement adapted to bring its orifice around said pin.

This arrangement has the advantage of enabling the materials or the foreign substances which have obstructed the diaphragm to pass through the place where the latter is positioned in the duct and to fall into said flow box, this avoiding the periodically return of the same foreign body to obstruct the diaphragm, which could occur if, on the contrary, the clearing pin was movable and the diaphragm fixed.

Preferably, said movement of the diaphragm is a rotary movement around a fixed axis, said clearing pin having a curvature centered on this axis.

Preferably also, said clearance actuating means comprise a pneumatic jack adapted to be supplied with compressed air through an electrovalve whose control input is connected to the output from said flow detector.

Again according to another feature of the invention, the metering device may be characterized in that said flow detector comprises, on the one hand, a movable strip arranged in the flow path of the material and able to occupy a first position when the flow is normal and a second position when the rate of flow reaches said predetermined lower threshold, and on the other hand, a movement detector adapted to provide a signal when said strip reaches the second position.

The above-mentioned movement detector may be constituted, for example, by a proximity detector, but it could also be constituted by any equivalent detector means, such as an optical or mechanical detection system or the like. A proximity detector has, however, the advantage of avoiding any risk of malfunction consequent upon possible disturbing effect by the powdery material.

One embodiment of the invention is described below by way of non-limiting example, with reference to the single FIGURE of the accompanying drawing, which shows diagrammatically a metering device for a powdery material according to the invention.

In the single FIGURE, there is shown at 1, an inclined duct in which a powdery material flows normally, for example alumina. This duct opens into a flow box 2 whose outlet 3 communicates with an installation (not shown) for the use of the powdery material, this installation being possibly, for example, a fluorine adsorption installation, such as that described in French Patent Application No. 7,119,494 in the name of the assignee.

The outlet 3 of the duct 1 for the introduction of the powdery material is partly closed by a removable diahragm 4 provided with a calibrated orifice 4a, the cross-section of this orifice having been determined so as to obtain a given flow rate for the powdery material in the duct. This removable diaphragm 4 is fixed to a movable flap 5 which can pivot on a fixed axle 6 arranged in the upper part of the flow box. Beyond the axle 6, the flap 5 is fast to a lever 7 whose end opposite the axle 6 is fixed to the end of the movable member 8 of a pneumatic jack 9. Between the movable flap 5 and the lower end of the duct 1 is arranged a flexible sealing joint 10.

The movable flap 5, the diaphragm 4, the lever 7 and the movable member 8 of the jack can thus be moved, by pivoting around the fixed axle 6, between the position shown in solid lines and the position shown in dashed lines, and for which the corresponding members have been denoted by the same reference numerals, to which a prime index has been added.

Within the flow box 2 is arranged, in addition, a freeing member constituted by a fixed pin 11 oriented on the path followed by the centre of the orifice of the diaphragm 4, when the latter is moved from position 4 to position 4', this pin having also a curvature centered on the fixed axle 6.

The flow box 2 contains lastly a flow detector comprising, on the one hand, a movable strip 12, arranged in the flow path of the powdery material and capable of occupying a first position (denoted by the reference 12), when the flow is normal, and a second position (denoted by the reference 12'), this second position being reached when the rate of flow reaches a predetermined lower threshold; this flow detector comprises, on the other hand, a movement detector constituted by a detecting head 13 responsive to the proximity of the movable strip 12 and fixed to the lower end of a fixed rod 14. This rod 14 is itself fixed to a support 15 which can also serve for the fixing of the movable strip 12, the latter being flexible. The movement detector 13 is arranged so as only to provide a signal, mainly an electrical signal, when the flexible strip 12 separates sufficiently therefrom to attain the position 12'.

The electrical signal concerned, which may be, for example, a fairly low voltage, is sent to the input 16 of an amplifier 17 whose output 18 is connected to the control input of an electrovalve 19. The electrovalve 19 is mounted in a compressed air supply duct 20 for the pneumatic jack 9, the jack being thus supplied when the electrovalve 19 receives a signal at its control input.

The operation of the device which has just been described is as follows:

When the orifice 4a of the diaphragm 4 is obturated, either by clogging substances mixed with the powdery material which flows in the duct 1, or by foreign bodies of more or less large size, the rate of flow of the product diminishes or ceases, so that the flexible strip 12 can pivot to attain the position marked by the reference 12'.

The detecting head 13 generates an electrical signal whose voltage is amplified by the amplifier 17, which causes, through the control 18, the opening of the electrovalve 19 for supplying the jack 9. the movable member 8 of the jack then comes into the position 8', which causes the rotation of the lever 7 and of the flap 5 around the axle 6, the lever and the flap then coming into the respective positions marked by the reference numbers 7' and 5'. The diaphragm 4 is then moved towards the clearing pin 11 until its orifice is completely engaged on the pin, following which the clogging substances or foreign bodies which had caused the obstruction of the diaphragm fall into the flow box 2.

It is to be noted that a slight time delay of the control signal for the opening of the electrovalve 19 must be provided, in order that the diaphragm 4 should not come back into its normal position at the outlet of the duct 1 before its orifice is entirely engaged on the fixed pin 11, the time necessary for this movement being possibly about a half second.

After interruption of the timed signal, the pneumatic jack is no longer supplied with compressed air and the movable members, denoted above by the reference numbers 4, 5, 7, 8 and 12, come back into their normal position shown in solid lines. The device is then again ready to operate to cause clearance of the diaphragm 4, as necessary.

As is self evident, and as emerges already from the foregoing, the invention is in no way limited to those of its types of application and embodiments which have been more particularly envisaged; it encompasses, on the contrary, all modifications.

We claim:

1. Declogging device for a duct in which normally flows a powdery material, said duct being provided at its outlet with a removable diaphragm comprising an orifice determining a normal flow rate of the material, said declogging device comprising: a flow detector for sensing the flow rate of the material and supplying at its output a signal when the rate of flow of said material is under or reaches a predetermined threshold lower than said normal flow rate, consequent upon partial or total obstruction of said orifice; a clearing pin; and actuating means connected to said output of the flow detector for causing said clearing pin to be engaged in said orifice of the diaphragm and to clear the latter when receiving said signal.

2. Device according to claim 1, wherein the said clearing pin is fixed in a flow box arranged downstream of said diaphragm, the latter being movable and able to effect, under the action of said actuating means, a movement adapted to bring its orifice around said pin.

3. Device according to claim 2, wherein said movement of the diaphragm is a rotary movement around a fixed axle, said clearing pin having a curvature centered on this axle.

4. Device according to claim 1, wherein said actuating means comprises a pneumatic jack adapted to cause a relative movement between said diaphragm and said pin, so that the latter may be engaged in said orifice, and to be supplied with compressed air through an electrovalve, the control input of the latter being connected to said output of the flow detector.

5. Device according to claim 1, wherein said flow detector comprises, on the one hand, a movable strip arranged on the flow path of the material and capable of occupying a first position when the flow rate is normal and a second position when the rate of flow is under or reaches said predetermined threshold and, on the other hand, a movement detector adapted to supply a signal when said strip reaches the second position.

* * * * *